(12) United States Patent
Iikawa

(10) Patent No.: US 6,778,332 B2
(45) Date of Patent: Aug. 17, 2004

(54) SOFT FOCUS LENS BARREL

(75) Inventor: Makoto Iikawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/619,564

(22) Filed: Jul. 16, 2003

(65) Prior Publication Data

US 2004/0012862 A1 Jan. 22, 2004

(30) Foreign Application Priority Data

Jul. 17, 2002 (JP) ......................................... 2002-208508

(51) Int. Cl.$^7$ ............................................. G02B 15/14
(52) U.S. Cl. ...................... 359/695; 359/823; 359/694
(58) Field of Search ................................. 359/694, 695, 359/701, 703, 823

(56) References Cited

U.S. PATENT DOCUMENTS

| | | | | |
|---|---|---|---|---|
| 3,994,572 A | * | 11/1976 | Uesugi et al. | 359/689 |
| 4,448,496 A | * | 5/1984 | Isobe et al. | 359/705 |
| 4,676,605 A | * | 6/1987 | Toda et al. | 359/696 |
| 5,302,991 A | * | 4/1994 | Nakayama | 396/81 |
| 5,517,361 A | * | 5/1996 | Inadome et al. | 359/684 |
| 5,673,149 A | * | 9/1997 | Okada | 359/557 |
| 5,914,819 A | * | 6/1999 | Kondo et al. | 359/679 |
| 5,991,093 A | | 11/1999 | Murata et al. | |
| 6,212,017 B1 | | 4/2001 | Murata | |
| 6,552,857 B2 | | 4/2003 | Sensui | |

* cited by examiner

*Primary Examiner*—Ricky Mack
(74) *Attorney, Agent, or Firm*—Greenblum & Bernstein, P.L.C.

(57) ABSTRACT

A soft focus lens barrel includes a stationary barrel; a distance operation ring, a soft focus operation ring, and an image surface operation ring, supported by the stationary barrel; a focus guide mechanism which varies a focal position of first through fourth lens groups by moving first and second lens group frames in the optical axis direction without varying the distance therebetween via rotation of the distance operation ring; a spherical aberration guide mechanism which varies spherical aberrations of the first through fourth lens groups by moving third and fourth lens group frames in the optical axis direction via rotation of the soft focus operation ring; and a field curvature guide mechanism which varies curvature of field produced by the first through fourth lens groups by solely moving the first lens group frame in the optical axis direction via rotation of the image surface operation ring.

7 Claims, 2 Drawing Sheets

SOFT FOCUS LENS BARREL

BACKGROUND OF THE INVENTION

1. Field of the Invention

The present invention relates to a soft focus lens barrel.

2. Description of the Related Art

In a known soft focus lens barrel, a soft focus can be controlled by varying the magnitude of spherical aberration. However, professional photographers or highly skilled amateur photographers sometimes want to emphasize a deformation caused by a curvature of field.

SUMMARY OF THE INVENTION

The present invention provides a soft focus lens barrel in which not only spherical aberration but also a curvature of field can be controlled by a simple structure.

According to an aspect of the present invention, a soft focus lens barrel is provided, including a stationary barrel to be secured to a camera body; first, second, third and fourth lens group frames which hold a first lens group, a second lens group, a third lens group and a fourth lens group, respectively, the first through fourth lens group frames being supported by the stationary barrel so as to move in an optical axis direction; a distance operation ring, a soft focus operation ring, and an image surface operation ring, each being supported by the stationary barrel so as to independently rotate; a focus guide mechanism which varies a resultant focal position of the first through fourth lens groups by moving the first and second lens group frames in the optical axis direction without varying the distance between the first and second lens group frames in accordance with a rotation of the distance operation ring; a spherical aberration guide mechanism which varies spherical aberrations produced by the first through fourth lens groups by moving the third and fourth lens group frames in the optical axis direction along predetermined paths, in accordance with a rotation of the soft focus operation ring; and a field curvature guide mechanism which varies a curvature of field produced by the first through fourth lens groups by solely moving the first lens group frame in the optical axis direction, in accordance with a rotation of the image surface operation ring.

It is desirable for the second, third and fourth lens group frames to be supported so as to move linearly in the optical axis direction but not to rotate about the optical axis, the first lens group frame being supported so as to rotate and axially move relative to the second lens group frame.

It is desirable for the first lens group frame and the image surface operation ring to be connected to each other so as to move relative to each other in the optical axis direction and rotate together, and wherein a cam mechanism is provided between the first lens group frame and the second lens group frame to relatively move the first and second lens group frames in the optical axis direction when a relative rotation occurs between the first and second lens group frames.

It is desirable for the distance operation ring and the second lens group frame to be associated with each other so that the second lens group frame is moved linearly in the optical axis direction in accordance with a rotation of the distance operation ring, the first lens group frame being engaged with the second lens group frame so that the first lens group frame is moved together with the second lens group frame in the optical axis direction when the image surface operation ring is not rotated.

According to another aspect of the present invention, a soft focus lens barrel is provided, including a stationary barrel secured to a camera body; first, second, third and fourth lens group frames which hold a first lens group, a second lens group, a third lens group and a fourth lens group, respectively, the first through fourth lens group frames being supported by the stationary barrel so as to move in an optical axis direction; a distance operation ring, a soft focus operation ring, and an image surface operation ring, each being supported by the stationary barrel so as to independently rotate; a focus guide mechanism which varies a resultant focal position of the first through fourth lens groups by moving the first and second lens group frames in the optical axis direction without varying the distance between the first and second lens group frames in accordance with a rotation of the distance operation ring; a spherical aberration guide mechanism which varies spherical aberrations produced by the first through fourth lens groups by moving the third and fourth lens group frames in the optical axis direction along predetermined paths, in accordance with a rotation of the soft focus operation ring; and a field curvature guide mechanism which varies a curvature of field produced by the first through fourth lens groups by moving the first lens group frame and the second lens group frame at predetermined paths in the optical axis direction, in accordance with a rotation of the image surface operation ring.

It is desirable for the focus guide mechanism to be provided with a focusing movement frame which is moved linearly in the optical axis direction in accordance with a rotation of the distance operation ring, the first lens group frame being supported so as to move relative to the focusing movement frame, the second lens group frame being supported by the first lens group frame so as to move only linearly in the optical axis direction, so that when no relative rotation of the first lens group frame to the focusing movement frame takes place, the first and second lens group frames are moved in the optical axis direction together with the focusing movement frame.

It is desirable for the first lens group frame and the image surface operation ring to be connected to each other so as to move relative to each other in the optical axis direction and rotate together, wherein a first cam mechanism is provided between the first lens group frame and the focusing movement frame to relatively move the frames in the optical axis direction when a relative rotation occurs between the first lens group frame and the focusing movement frame, and wherein a second cam mechanism is provided between the second lens group frame and the focusing movement frame to relatively move the frames in the optical axis direction when a relative rotation occurs between the second lens group frame and the focusing movement frame.

The present disclosure relates to subject matter contained in Japanese Patent Application No.2002-208508 (filed on Jul. 17, 2002) which is expressly incorporated herein by reference in its entirety.

BRIEF DESCRIPTION OF THE DRAWINGS

The present invention will be discussed below with reference to the accompanying drawings in which.

DESCRIPTION OF THE PREFERRED EMBODIMENTS

Figure 1:
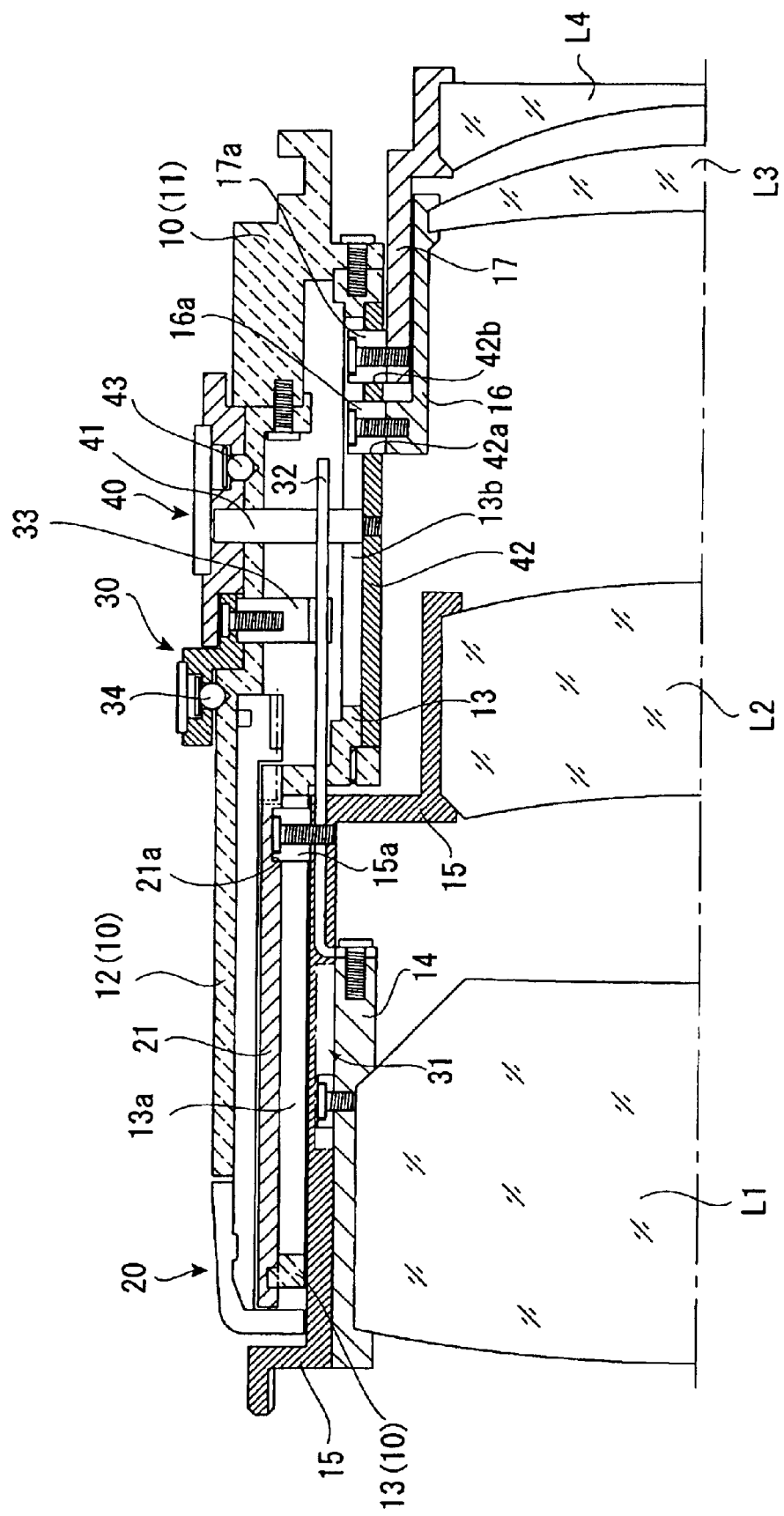
FIG. 1 is a longitudinal sectional view of an embodiment of a soft focusing lens barrel according to the present invention.

In FIG. 1, which shows a first embodiment of a soft focus lens barrel of the present invention, a stationary barrel 10 to be secured to a camera body includes a mount ring 11, an outer ring 12 secured to the mount ring 11, and an inner ring 13. The stationary barrel 10 rotatably supports a distance operation ring (focusing ring) 20 thereon between the outer ring 12 and the inner ring 13, an image surface operation ring 30 provided on the outer surface of the outer ring 12, and a soft focus operation ring 40. The distance operation ring 20, image surface operation ring 30 and soft focus operation ring 40 are arranged in that order from the front end side of the stationary barrel 10.

A first lens group L1 of positive power, a second lens group L2 of negative power, a third lens group L3 of positive power and a fourth lens group L4 of negative power are arranged in that order from the object side inside the inner ring 13. The first through fourth lens groups L1 through L4 are secured to a first lens group frame 14, a second lens group frame 15, a third lens group frame 16 and a fourth lens group frame 17, respectively.

The distance operation ring 20 is connected to a lead ring 21 which is rotatably supported on the outer surface of the inner ring 13 so as to rotate together with the lead ring 21. The lead ring 21 is provided with a lead groove (linear groove) 21a which has an optical axis direction component and a circumferential component. A follower pin 15a formed on the outer peripheral surface of the second lens group frame 15 is fitted in the lead groove 21a. The follower pin 15a is also fitted in a linear movement guide groove 13a which is formed in the inner ring 13 and which extends in parallel with the optical axis. Consequently, when the lead ring 21 (distance operation ring 20) rotates, the second lens group frame 15 (second lens group L2) is linearly moved in the optical axis direction.

The first lens group frame 14 which supports the first lens group L1 is fitted in the second lens group frame 15 so as to move relative to each other. A cam mechanism 31 is formed between the first lens group frame 14 and the second lens group frame 15, so that when a relative rotation occurs between the first and second lens group frames 14 and 15, the lens group frames 14 and 15 are relatively moved in the optical axis direction. An image surface drive bar 32 is secured to a rear end face of the first lens group frame 14. The image surface drive bar 32 extends rearwardly and is connected to an image surface drive member 33 which is secured to the inner surface of the image surface operation ring 30 so as to relatively move in the optical axis direction and to rotate together. The image surface operation ring 30 is provided with a click mechanism 34.

The soft focus operation ring 40 is connected to a cam ring 42 which is rotatably supported on the inner peripheral surface of the inner ring 13 through a radial pin 41 so as to rotate always together with the cam ring 42. The third lens group frame 16 which supports the third lens group L3 and the fourth lens group frame 17 which supports the fourth lens group L4 are provided, on the outer peripheral surfaces thereof, with follower pins 16a and 17a which are fitted in cam grooves 42a and 42b of the cam ring 42, respectively. The follower pins 16a and 17a are fitted in a linear movement guide groove 13b which is formed in the inner ring 13 and which extends in parallel with the optical axis. The soft focus operation ring 40 is provided with a click mechanism 43.

In a soft focus lens barrel constructed as above, the focusing operation is carried out by moving the first and second lens groups L1 and L2 together in the optical axis direction. The soft-focusing operation (to vary the magnitude of the spherical aberration) is carried out by moving the third and fourth lens groups L3 and L4 in the optical axis direction along predetermined paths (cam profiles). The curvature of field operation is carried out by solely moving the first lens group L1 in the optical axis direction. Namely, the lead ring 21 (lead groove 21a) which is rotated by the distance operation ring 20, the second lens group frame 15 (follower pin 15a), the inner ring 13 (linear movement guide groove 13a) which guides the linear movement of the second lens group frame 15, and the cam mechanism (axial drive force transmission device) 31 provided between the second lens group frame 15 and the first lens group frame 14 constitute a focus guide mechanism. The radial pin 41 of the soft focus operation ring 40, the cam ring 42 (cam grooves 42a, 42b) which is rotated through the radial pin 41, the third and fourth lens group frames 16 and 17 (follower pins 16a, 17a), and the inner ring 13 (linear movement guide groove 13b) which guides the linear movement of the third and fourth lens group frames 16 and 17 constitute a spherical aberration guide mechanism for soft-focusing. The image surface drive member 33 provided on the image surface operation ring 30, the image surface drive bar 32 which is rotated together with the image surface drive member 33, the first and second lens group frames 14 and 15, and the cam mechanism 31 provided between the first and second lens group frames 14 and 15 constitute a field curvature guide mechanism.

The soft focus lens barrel discussed above operates as follows. The focusing operation is carried out by the rotation of the distance operation ring 20. The distance operation ring 20 rotates together with the lead ring 21 fitted therein and moves the second lens group frame 15 in the optical axis direction, which is guided through the inner ring 13 (linear movement guide groove 13a), in accordance with the engagement of the lead groove 21a formed in the lead ring 21 and the follower pin 15a. The first lens group frame 14 is guided to move in the optical axis direction through the engagement of the image surface drive bar 32 and the image surface drive member 33 when the image surface operation ring 30 is not rotated. The cam mechanism 31, provided between the first lens group frame 14 and the second lens group frame 15, transmits the axial movement force from one of the lens group frames 14 and 15 to the other when no relative rotation occurs therebetween. Consequently, the first lens group frame 14 is moved in the optical axis direction in accordance with the movement of the second lens group frame 15. As a result, the first lens group L1 and the second lens group L2 supported by the first lens group frame 14 and the second lens group frame 15, respectively, are moved together in the optical axis direction without varying the distance therebetween, so as to perform a focusing operation.

A soft focusing effect is performed by the rotation of the soft focus operation ring 40. When the soft focus operation ring 40 is rotated, rotational force is transmitted to the cam ring 42 via the radial pin 41. As a result, the third and fourth lens group frames 16 and 17, which are guided to move linearly through the inner ring 13 (linear movement guide groove 13b) are relatively moved in the optical axis direction along predetermined paths (cam profiles), in accordance with the engagement between the cam grooves 42a and 42b formed in the cam ring 42 and the follower pins 16a and 17a. The relative movement of the third and fourth lens groups L3 and L4 varies the magnitude of the spherical aberration to thereby obtain a soft focusing effect.

A field curvature effect is obtained by the rotation of the image surface operation ring 30. When the image surface operation ring 30 is rotated, the image surface drive member 33 and the image surface drive bar 32 are rotated together. The rotation of the image surface drive bar 32 whose front end is secured to the first lens group L1 (i.e., the first lens group frame 14) is transmitted to the first lens group L1. The cam mechanism 31 which moves the first lens group frame 14 and the second lens group frame 15 together upon focusing, as mentioned above, moves the first and second lens group frames 14 and 15 relative to each other in the optical axis direction when the first and second lens group frames rotate relative to each other. Therefore, when the first lens group frame 14 rotates relative to the second lens group frame 15, which is always guided to linearly move through the inner ring 13 (linear movement guide groove 13a), a movement of the first lens group frame 14 relative to the second lens group frame 15 in the optical axis direction occurs via the cam mechanism 31 so that the first lens group L1 is solely moved in the optical axis direction while rotating. This movement of the first lens group L1 provides a field curvature effect.

Figure 2:
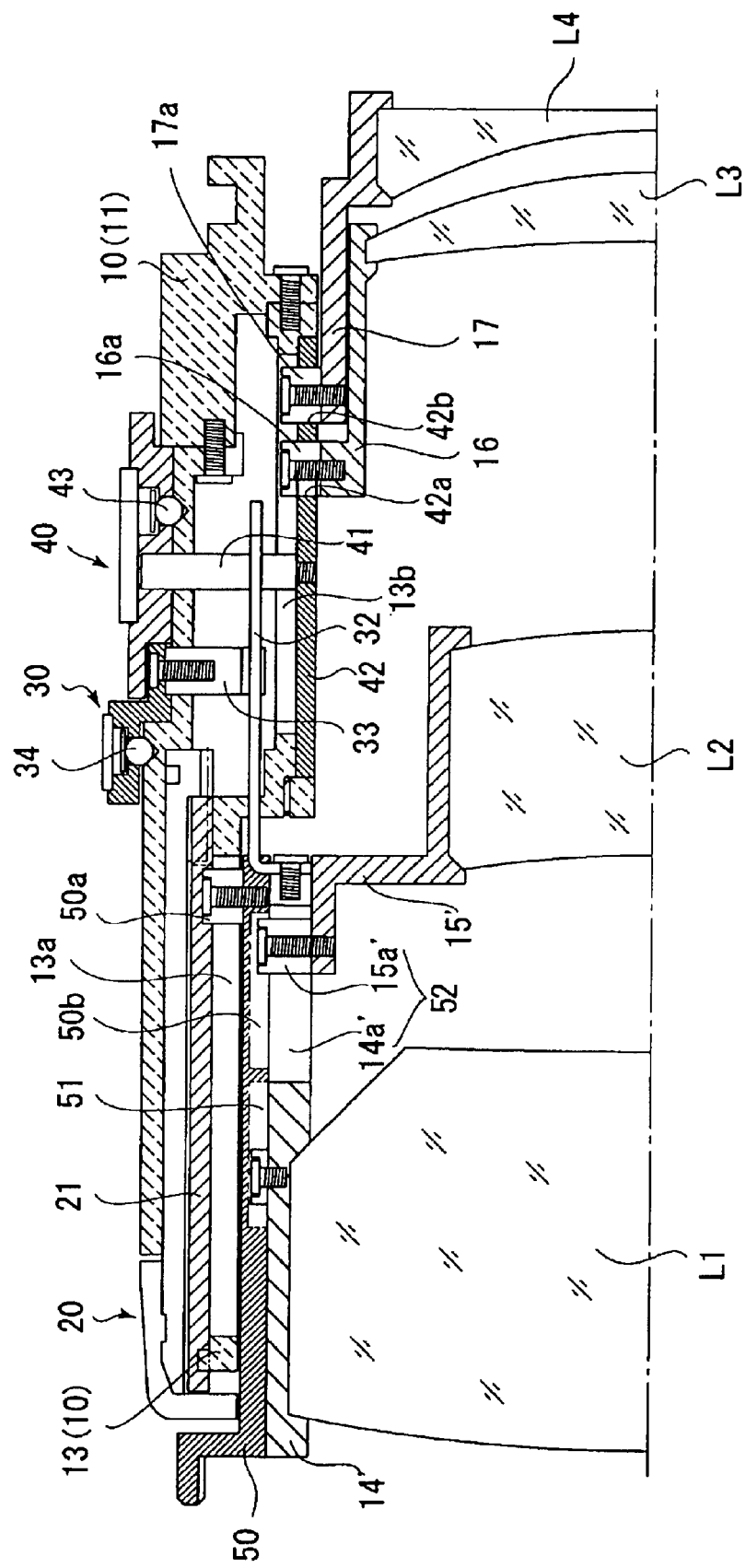
FIG. 2 is a longitudinal sectional view of a second embodiment of a soft focus lens barrel according to the present invention.

FIG. 2 shows a second embodiment of a soft focus lens barrel according to the present invention. In FIG. 2, the elements corresponding to those in FIG. 1 are given like reference numbers, and no duplicate explanation will be given hereinafter. A difference of the second embodiment from the first embodiment resides in a focusing movement frame 50. The focusing movement frame 50 is provided on the outer peripheral surface thereof with a follower pin 50a which is fitted in the lead groove 21a of the lead ring 21. The follower pin 50a is also fitted in the linear movement guide groove 13a formed in the inner ring 13 and extending in parallel with the optical axis. Consequently, when the lead ring 21 (distance operation ring 20) is rotated, the focusing movement frame 50 is linearly moved in the optical axis direction.

A first cam mechanism 51 is provided between the focusing movement frame 50 and a first lens group frame 14' to cause a relative movement in the optical axis direction between the focusing movement frame 50 and the first lens group frame 14' when a relative rotation occurs therebetween. As the same as in the first embodiment, the first lens group frame 14' is secured at its rear end to the image surface drive bar 32 through which the rotational force of the image surface operation ring 30 is transmitted to the first lens group frame 14'. The focusing movement frame 50 is provided on the inner peripheral surface thereof with a linear movement guide groove 50b extending parallel with the optical axis. A follower pin 15a' provided on the outer peripheral surface of a second lens group frame 15' is fitted in the linear movement guide groove 50b. The follower pin 15a' is also fitted in a through cam slot 14a' formed in the first lens group frame 14'. Consequently, when the first lens group frame 14' rotates, the second lens group frame 15' which is guided to linearly move in the optical axis direction through the linear movement guide groove 50b is moved in the optical axis direction relative to the first lens group frame 14' due to the engagement of the follower pin 15a' and the through cam slot 14a'.

In the above-described soft focus lens barrel, according to the second embodiment of the present invention, focusing is carried out by moving the first and second lens groups L1 and L2 together in the optical axis direction, and a soft focusing effect (variation in the spherical aberration) is obtained by moving the third lens group L3 and the fourth lens group L4 along predetermined paths (cam profile) in the optical axis direction, as in the first embodiment. The second embodiment differs from the first embodiment only in the field curvature effect. Namely, in the second embodiment, the field curvature effect is obtained by moving both the first lens group L1 and the second lens group L2 in the optical axis direction along predetermined paths (cam profiles). The lead ring 21 (lead groove 21a) which is rotated by the distance operation ring 20, the focusing movement frame 50, the first lens group frame 14', the first cam mechanism (axial force transmission device) 51 provided between the first lens group frame 14' and the focusing movement frame 50, and the axial force transmission device (through cam slot 14a' and follower pin 15a') provided between the first lens group frame 14' and the second lens group frame 15' constitute a focus guide mechanism.

The image surface drive member 33 provided on the image surface operation ring 30, the image surface drive bar 32 which is rotated together with the image surface drive member 33, the first lens group frame 14', the first cam mechanism 51 provided between the first lens group frame 14' and the focusing movement frame 50, the second lens group frame 15', a second cam mechanism (follower pin 15a', through cam slot 14a') 52 provided between the second lens group frame 15' and the first lens group frame 14', and the linear movement guide groove 50b which guides a linear movement of the second lens group frame 15' constitute a field curvature guide mechanism.

The radial pin 41 of the soft focus operation ring 40, the cam ring 42 (cam grooves 42a, 42b) which is rotated through the radial pin 41, the third and fourth lens group frames 16 and 17 (follower pins 16a, 17a), and the inner ring 13 (linear movement guide groove 13b) which guides the linear movement of the third and fourth lens group frames 16 and 17 constitutes a spherical aberration guide mechanism for soft-focusing, as in the first embodiment.

The soft focus lens barrel shown in FIG. 2 operates as follows. The focusing operation is carried out by the rotation of the distance operation ring 20. The distance operation ring 20 rotates together with the lead ring 21 fitted therein and moves the focusing movement frame 50 in the optical axis direction, which is guided through the inner ring 13 (linear movement guide groove 13a), in accordance with the engagement of the lead groove 21a formed in the lead ring 21 and the follower pin 50a. The first cam mechanism 51 moves the first lens group frame 14' together with the focusing movement frame 50 in the optical axis direction when the focusing movement frame 50 is moved in the optical axis direction. The axial force transmission device (through the cam slot 14a' and the follower pin 15a') provided between the first lens group frame 14' and the second lens group frame 15' moves the second lens group frame 15' which is guided to move linearly in the optical axis direction via the linear movement guide groove 50b of the focusing movement frame 50, together with the first lens group frame 14' in the optical axis direction. Namely, when the distance operation ring 20 is rotated, the first and second lens group frames 14' and 15' are moved together in the optical axis direction, without varying the distance therebetween, together with the focusing movement frame 50, so as to perform a focusing operation.

The soft focusing operation is executed by the rotation of the soft focus operation ring 40. The spherical aberration guide mechanism which obtains the soft focusing effect is the same as that in the first embodiment. When the soft focus operation ring 40 is rotated, the third and fourth lens groups L3 and L4 are moved in accordance with the predetermined paths (cam profiles) to vary the spherical aberration.

A field curvature effect is achieved by the rotation of the image surface operation ring 30. When the image surface operation ring 30 is rotated, the image surface drive member 33 and the image surface drive bar 32 are rotated together. The rotation of the image surface drive bar 32 whose front end is secured to the first lens group frame 14' is transmitted to the first lens group frame 14'. The first cam mechanism 51 provided between the focusing movement frame 50 and the first lens group frame 14' moves the first lens group frame 14' in the optical axis direction while rotating the same. The rotational force of the first lens group frame 14' is transmitted to the engagement of the follower pin 15a' with the through cam slot 14a', so that the second lens group frame 15 which is guided to linearly move through the linear movement guide groove 50b and which has the follower pin 15a' is moved relative to the first lens group frame 14' in the optical axis direction. Namely, the first lens group L1 and the second lens group L2 are moved in the optical axis direction in accordance with different paths, and accordingly, a field curvature effect can be achieved.

As can be understood from the above discussion, according to the present invention, a soft focus lens barrel in which not only the spherical aberration but also the field curvature can be controlled by a simple structure can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A soft focus lens barrel comprising:
   a stationary barrel to be secured to a camera body;
   first, second, third and fourth lens group frames which hold a first lens group, a second lens group, a third lens group and a fourth lens group, respectively, said first through fourth lens group frames being supported by the stationary barrel so as to move in an optical axis direction;
   a distance operation ring, a soft focus operation ring, and an image surface operation ring, each being supported by the stationary barrel so as to independently rotate;
   a focus guide mechanism which varies a resultant focal position of the first through fourth lens groups by moving the first and second lens group frames in the optical axis direction without varying the distance between the first and second lens group frames in accordance with a rotation of said distance operation ring;
   a spherical aberration guide mechanism which varies spherical aberrations produced by the first through fourth lens groups by moving the third and fourth lens group frames in the optical axis direction along predetermined paths, in accordance with a rotation of said soft focus operation ring; and
   a field curvature guide mechanism which varies a curvature of field produced by the first through fourth lens groups by solely moving the first lens group frame in the optical axis direction, in accordance with a rotation of said image surface operation ring.

2. The soft focus lens barrel according to claim 1, wherein the second, third and fourth lens group frames are supported so as to move linearly in the optical axis direction but not to rotate about the optical axis, said first lens group frame being supported so as to rotate and axially move relative to the second lens group frame.

3. The soft focus lens barrel according to claim 2, wherein the first lens group frame and the image surface operation ring are connected to each other so as to move relative to each other in the optical axis direction and rotate together, and wherein a cam mechanism is provided between the first lens group frame and the second lens group frame to relatively move the first and second lens group frames in the optical axis direction when a relative rotation occurs between the first and second lens group frames.

4. The soft focus lens barrel according to claim 3, wherein the distance operation ring and the second lens group frame are associated with each other so that the second lens group frame is moved linearly in the optical axis direction in accordance with a rotation of the distance operation ring, said first lens group frame being engaged with the second lens group frame so that the first lens group frame is moved together with the second lens group frame in the optical axis direction when the image surface operation ring is not rotated.

5. A soft focus lens barrel comprising:
   a stationary barrel secured to a camera body;
   first, second, third and fourth lens group frames which hold a first lens group, a second lens group, a third lens group and a fourth lens group, respectively, said first through fourth lens group frames being supported by the stationary barrel so as to move in an optical axis direction;
   a distance operation ring, a soft focus operation ring, and an image surface operation ring, each being supported by the stationary barrel so as to independently rotate;
   a focus guide mechanism which varies a resultant focal position of the first through fourth lens groups by moving the first and second lens group frames in the optical axis direction without varying the distance between the first and second lens group frames in accordance with a rotation of said distance operation ring;
   a spherical aberration guide mechanism which varies spherical aberrations produced by the first through fourth lens groups by moving the third and fourth lens group frames in the optical axis direction along predetermined paths, in accordance with a rotation of said soft focus operation ring; and
   a field curvature guide mechanism which varies a curvature of field produced by the first through fourth lens groups by moving the first lens group frame and the second lens group frame at predetermined paths in the optical axis direction, in accordance with a rotation of said image surface operation ring.

6. The soft focus lens barrel according to claim 5, wherein the focus guide mechanism is provided with a focusing movement frame which is moved linearly in the optical axis direction in accordance with a rotation of the distance operation ring, said first lens group frame being supported so as to move relative to the focusing movement frame, said second lens group frame being supported by the first lens group frame so as to move only linearly in the optical axis direction, so that when no relative rotation of the first lens group frame to the focusing movement frame takes place, the first and second lens group frames are moved in the optical axis direction together with the focusing movement frame.

7. The soft focus lens barrel according to claim 6, wherein the first lens group frame and the image surface operation ring are connected to each other so as to move relative to each other in the optical axis direction and rotate together, wherein a first cam mechanism is provided between the first lens group frame and the focusing movement frame to relatively move the frames in the optical axis direction when a relative rotation occurs between the first lens group frame and the focusing movement frame, and wherein a second cam mechanism is provided between the second lens group frame and the focusing movement frame to relatively move the frames in the optical axis direction when a relative rotation occurs between the second lens group frame and the focusing movement frame.

* * * * *